United States Patent
Setterberg et al.

(10) Patent No.: US 9,514,352 B2
(45) Date of Patent: Dec. 6, 2016

(54) FINGERPRINT ENROLLMENT USING TOUCH SENSOR DATA

(71) Applicant: FINGERPRINT CARDS AB, Göteborg (SE)

(72) Inventors: Eric Setterberg, Västra Frölunda (SE); Hamid Sarvé, Göteborg (SE); David Tingdahl, Göteborg (SE)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/833,809

(22) Filed: Aug. 24, 2015

(65) Prior Publication Data

US 2016/0180145 A1  Jun. 23, 2016

(30) Foreign Application Priority Data

Dec. 18, 2014 (SE) .................................. 1451574-6

(51) Int. Cl.
*G06K 9/00* (2006.01)
*G06F 3/041* (2006.01)
*G06F 21/32* (2013.01)
*G06F 3/0354* (2013.01)

(52) U.S. Cl.
CPC ....... *G06K 9/00087* (2013.01); *G06F 3/03547* (2013.01); *G06F 21/32* (2013.01); *G06K 9/00013* (2013.01); *G06K 9/00026* (2013.01)

(58) Field of Classification Search
None
See application file for complete search history.

(56) References Cited

U.S. PATENT DOCUMENTS

| 5,828,773 A | 10/1998 | Setlak et al. |
| 6,795,569 B1 | 9/2004 | Setlak |
| 2010/0303311 A1 | 12/2010 | Shin et al. |
| 2012/0127179 A1* | 5/2012 | Aspelin ................. G06F 21/32 345/441 |

(Continued)

FOREIGN PATENT DOCUMENTS

WO  9846114 A2  10/1998

OTHER PUBLICATIONS

PCT International Search Report and Written Opinion dated Dec. 2, 2015 for PCT International Application No. PCT/SE2015/050927 (19 pages).

*Primary Examiner* — Matthew Bella
*Assistant Examiner* — Jose M Torres
(74) *Attorney, Agent, or Firm* — Remarck Law Group PLC (57) ABSTRACT

The present invention relates to a method of enrolling a fingerprint of a user's finger, by means of an electronic device comprising a touch sensor having an active area corresponding to a first surface portion of the electronic device; and a fingerprint sensor having an active area corresponding to a second surface portion of the electronic device. The comprises the steps of acquiring a touch sensor signal indicative of a sub-area of the touch sensor being touched by the finger; acquiring a partial fingerprint image of a portion of the fingerprint; a positional relationship between the portion of the fingerprint and the finger based on the sub-area and a positional relationship between the first and second surface portions of the electronic device; and forming a fingerprint template based on acquired partial fingerprint images and the determined positional relationships.

12 Claims, 7 Drawing Sheets

(56) References Cited

U.S. PATENT DOCUMENTS

| | | |
|---|---|---|
| 2013/0259330 A1 | 10/2013 | Russo et al. |
| 2013/0272586 A1* | 10/2013 | Russo ................ G06K 9/00087 382/124 |
| 2014/0003677 A1 | 1/2014 | Han et al. |
| 2014/0003678 A1 | 1/2014 | Vieta et al. |
| 2014/0003679 A1 | 1/2014 | Han et al. |
| 2015/0235098 A1* | 8/2015 | Lee .................... G06K 9/00912 715/709 |

* cited by examiner

FINGERPRINT ENROLLMENT USING TOUCH SENSOR DATA

CROSS-REFERENCE TO RELATED APPLICATIONS

This application claims the benefit of Swedish Patent Application No. 1451574-6, filed Dec. 18, 2014. The disclosure of the above application is incorporated herein by reference in its entirety.

FIELD OF THE INVENTION

The present invention relates to a method of enrolling a fingerprint, and to an electronic device for enrolling a fingerprint.

BACKGROUND OF THE INVENTION

Various types of biometric systems are used more and more in order to provide for increased security and/or enhanced user convenience.

In particular, fingerprint sensing systems have been adopted in, for example, consumer electronic devices, thanks to their small form factor, high performance, and user acceptance.

To save cost and valuable surface space, there is an effort towards smaller and smaller fingerprint sensors, which may be substantially smaller than the user's fingerprint.

One way of achieving satisfactory biometric performance with a small fingerprint sensor is to provide a so-called swipe sensor or strip sensor. By instructing the user to swipe his finger across the sensor surface and capturing image slices during the swiping motion sufficient fingerprint information can be collected.

For some applications, however, swiping the finger across the sensor may not be considered to be sufficiently intuitive and simple to the user.

For such and other applications, fingerprint sensing systems employing small sensors for stationary finger placement have been proposed. In such fingerprint sensing systems, the user may be authenticated against an enrolled fingerprint representation (often referred to as a template) based on a single partial fingerprint image from the sensor.

For achieving the desired satisfactory biometric performance when authenticating based on a single partial fingerprint image from a small fingerprint sensor, it may be necessary that the enrolled template corresponds to a considerably larger portion of the user's fingerprint than the partial fingerprint image captured in connection with an authentication attempt.

One way of achieving such a larger enrolled template is to enroll users on a larger fingerprint sensor. This approach is, however, not suitable for many applications where enrollment and authentication should be carried out using the same electronic device, such as a mobile communication device.

It has therefore been proposed to combine several partial images from corresponding finger placements on a small fingerprint sensor to form a combined template for enrollment. It has, however, been found that it may sometimes be difficult to combine the partial images for various reasons.

US 2014/0003678 discloses an enrollment method in which navigation information from one or more navigation sensors is used to determine if there has been finger motion between partial fingerprint images. If there has been motion between images, the partial fingerprint image is adjusted using the navigation information.

However, there appears to still be room for improvement. In particular, it would be desirable to provide for a facilitated combination of partial fingerprint images, resulting in an enrollment procedure that is more convenient for the user.

SUMMARY

In view of the above-mentioned and other drawbacks of the prior art, it is an object of the present invention to provide for improved enrollment using partial fingerprint images, in particular an enrollment procedure that is more convenient for the user.

According to a first aspect of the present invention, it is therefore provided a method of enrolling a fingerprint of a user's finger, by means of an electronic device comprising: a touch sensor for touch-based control of the electronic device, the touch sensor having an active area corresponding to a first surface portion of the electronic device; and a fingerprint sensor having an active area corresponding to a second surface portion of the electronic device. The method comprises the steps of:

a) acquiring, from the touch sensor, for each finger placement in a sequence of finger placements on the fingerprint sensor, a touch sensor signal indicative of a sub-area of the touch sensor being touched by the finger;

b) acquiring, from the fingerprint sensor, for each finger placement in the sequence of finger placements on the fingerprint sensor, a partial fingerprint image of a portion of the fingerprint;

c) determining, for each finger placement in the sequence of finger placements on the fingerprint sensor, a positional relationship between the portion of the fingerprint and the finger based on the sub-area and a positional relationship between the first and second surface portions of the electronic device;

d) forming a fingerprint template based on the acquired partial fingerprint images and the determined positional relationships; and e) saving the fingerprint template together with an identifier for the fingerprint to thereby enroll the fingerprint.

It should be noted that the steps of methods according to embodiments of the present invention need not necessarily be in the order recited in the claims.

The touch sensor may be any sensor capable of providing a touch sensor signal indicative of a sub-area of the touch sensor being touched by a finger. Such touch sensors are per se known and may, for example, utilize capacitive, resistive, thermal or optical methods for sensing at least the presence and location of a finger on the touch sensor. Touch sensors are widely employed in, for instance, the touch display of smart phones and tablets, and also in the track pad of lap top computers etc. It should be understood that active circuitry of the touch sensor need not be directly touched by the finger, but that the touch sensor may sense a finger touch through some protective coating, such as a glass cover. A finger touching a sub-area of a protective cover arranged on top of the touch sensor is considered to be touching a sub-area of the touch sensor.

The fingerprint sensor may, for example, be a capacitive fingerprint sensor detecting a measure indicative of the capacitive coupling between each sensing element in an array of sensing elements and a finger surface touching the sensor surface. Sensing elements at locations corresponding to ridges in the fingerprint will exhibit a stronger capacitive coupling to the finger than sensing elements at locations corresponding to valleys in the fingerprint.

However, the various embodiments of the present invention are not limited to a particular fingerprint sensing technology, but are equally applicable to, for instance, optical, thermal or piezo-electric fingerprint sensors etc.

The present invention is based upon the realization that the fingerprint sensor, in an electronic device also comprising a touch sensor, may be arranged sufficiently close to the touch sensor that a finger placement on the fingerprint sensor practically always also results in the finger touching the touch sensor, and that information about the finger touch on the touch sensor can be used to improve the formation of a fingerprint template based on several partial fingerprint images from the fingerprint sensor.

In particular, the present inventors have realized that information about the finger touch on the touch sensor together with the known positional relationship between the touch sensor and the fingerprint sensor can be used to at least approximately relate the acquired partial fingerprint image to a corresponding portion of the user's fingerprint. For instance, the portion of the fingerprint in the acquired partial fingerprint image can be related to a finger co-ordinate system.

Embodiments of the present invention enable the use of partial fingerprint images for forming a combined fingerprint template even when the partial fingerprint images do not partially overlap. Furthermore, different orientations of the finger may be accounted for using finger orientation information that can be obtained from the touch sensor signal. Hence, fewer partial fingerprint images may need to be acquired, which in turn provides for a faster enrollment procedure that is more convenient for the user.

In various embodiments, the method according to the present invention may advantageously further comprise the following step:

f) determining a total coverage of the fingerprint by the portions of the fingerprint imaged in the sequence of finger placements.

The total coverage may simply be the total area of the fingerprint covered by the portions of the fingerprint in the partial fingerprint images. Alternatively, or in combination, the total coverage may be a measure of the fraction of the fingerprint that is covered by the portions of the fingerprint imaged so far.

To ensure that a sufficient portion of the user's fingerprint has been imaged by the partial fingerprint images to be able to form a high quality fingerprint template, the above-mentioned steps a) to c) may be repeated until the determined total coverage exceeds a threshold coverage.

The threshold coverage may be a predefined threshold coverage, which may be the same for all users or individualized based on various factors for estimating a finger size, such as gender and/or age.

Alternatively, the threshold coverage may advantageously be based on at least one observation of the particular user. According to embodiments of the present invention, the method may thus further comprise the following step:

g) determining the threshold coverage based on at least one acquired touch sensor signal.

Hereby, the threshold coverage can be adapted to the particular finger to be enrolled, which provides for an appropriate number of partial fingerprint images being acquired. That is, neither too few nor too many partial fingerprint images may be acquired, to provide for a user-convenient enrollment of a fingerprint template having a sufficient quality and size.

The threshold coverage may be based on at least one dimension (such as the width, length and/or surface area) of the finger, which may be estimated based on at least one touch sensor signal.

In this context, it should be noted that the at least one touch sensor signal used for estimating the threshold coverage may or may not be among the touch sensor signals acquired in connection with acquisition of the partial fingerprint images. The at least one touch sensor signal used for estimating the threshold coverage by estimating the at least one finger dimension may be acquired from the touch sensor at another time and/or in connection with another procedure.

It may, however, be advantageous to base the estimation of the at least one dimension of the user's finger (fingerprint) on at least one touch sensor signal among the touch sensor signal acquired in connection with acquisition of the partial fingerprint images, as this will ensure that the at least one dimension of the correct finger is estimated.

According to various embodiments, furthermore, the method of the invention may additionally comprise the step of:

i) extracting, prior to step d), for each finger placement in the sequence of finger placements on the fingerprint sensor, template data from the partial fingerprint image.

Template data may, for example, be minutiae or another representation of characteristic information of the fingerprint. Various ways of extracting such template data from a fingerprint image are well-known to a person of ordinary skill in the relevant art.

According to a second aspect of the present invention, there is provided an electronic device comprising a touch sensor for touch-based control of the electronic device, the touch sensor having an active area corresponding to a first surface portion of the electronic device; a fingerprint sensor having an active area corresponding to a second surface portion of the electronic device; a user interface; a memory; and processing circuitry connected to the touch sensor, the fingerprint sensor, the user interface, and the memory for: acquiring, from the touch sensor, for each finger placement in a sequence of finger placements on the fingerprint sensor, a touch sensor signal indicative of a sub-area of the touch sensor being touched by the finger; acquiring, from the fingerprint sensor, for each finger placement in the sequence of finger placements on the fingerprint sensor, a partial fingerprint image of a portion of the fingerprint; determining, for each finger placement in the sequence of finger placements on the fingerprint sensor, a positional relationship between the portion of the fingerprint and the finger based on the sub-area and a positional relationship between the first and second surface portions of the electronic device; forming a fingerprint template based on the acquired partial fingerprint images and the determined positional relationships; and saving, in the memory, the fingerprint template together with an identifier for the fingerprint to thereby enroll the fingerprint.

The processing circuitry may be provided in the form of one or several processors, which may also control other functions of the electronic device.

The above-mentioned first and second surface portions may advantageously be arranged in such a way that placement of a finger on the fingerprint sensor almost inevitably results in at least a portion of the finger also covering the touch sensor. To that end, the fingerprint sensor may be arranged substantially directly adjacent to the touch sensor, or be at least partly surrounded by the touch sensor. In embodiments, a portion of the touch sensor may be configured to function as the fingerprint sensor, for example by having a considerably higher resolution than other portions of the touch sensor.

Moreover, the first and second surface portions may advantageously be on the same face of the electronic device (if the electronic device has a substantially planar face), to facilitate simultaneous placement of the finger on the touch sensor and the fingerprint sensor.

Further embodiments of, and effects obtained through this second aspect of the present invention are largely analogous to those described above for the first aspect of the invention.

In summary, the present invention relates to a method of enrolling a fingerprint of a user's finger, by means of an electronic device comprising a touch sensor having an active area corresponding to a first surface portion of the electronic device; and a fingerprint sensor having an active area corresponding to a second surface portion of the electronic device. The comprises the steps of acquiring a touch sensor signal indicative of a sub-area of the touch sensor being touched by the finger; acquiring a partial fingerprint image of a portion of the fingerprint; a positional relationship between the portion of the fingerprint and the finger based on the sub-area and a positional relationship between the first and second surface portions of the electronic device; and forming a fingerprint template based on acquired partial fingerprint images and the determined positional relationships.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the method and electronic device according to the present invention are mainly described with reference to a substantially square fingerprint sensor arranged adjacent to the touch display of a mobile phone.

It should be noted that this by no means limits the scope of the present invention, which equally well includes, for example, other electronic devices such as tablets, computers or watches. Furthermore, the fingerprint sensor may have any other shape. For instance, the fingerprint sensor may be provided as an elongated rectangle.

Figure 1A:
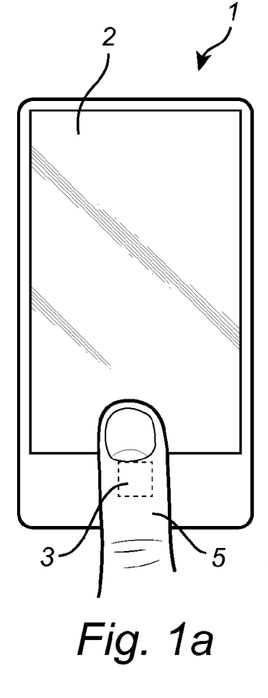
FIGS. 1a-c schematically show three different exemplary authentication attempts using a small fingerprint sensor.
Figure 1B:
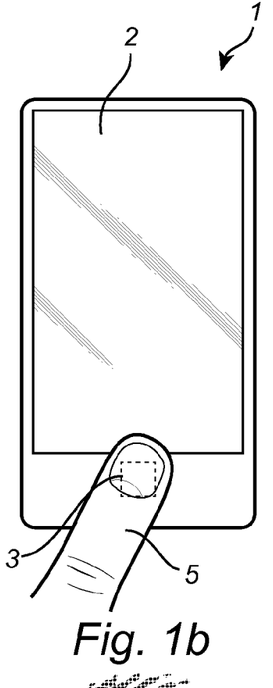
Figure 1C:
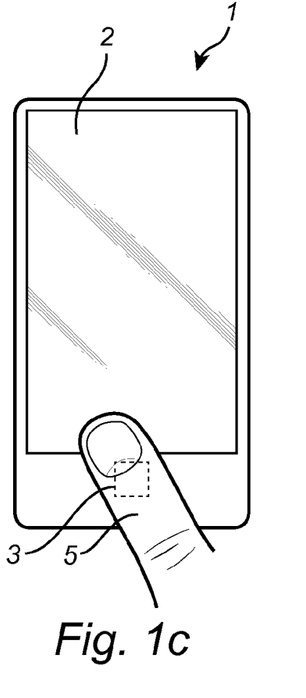

For the purpose of providing an introduction to the challenges involved in using a small fingerprint sensor, FIGS. 1a-c schematically show three different exemplary authentication attempts using a small fingerprint sensor.

Referring first to FIG. 1a, an electronic device, here in the form of mobile phone 1, comprises a touch display 2 and a fingerprint sensor 3. The touch display 2 comprises a touch sensor for touch-based control of the mobile phone 1 and a display acting as a user interface.

In FIG. 1a, the user of the mobile phone 1 makes a first authentication attempt by placing his finger 5 on the fingerprint sensor 3.

FIG. 1b and FIG. 1c illustrate second and third authentication attempts in which the user places his finger 5 on the fingerprint sensor 3.

As is indicated in FIGS. 1a-c, a user will typically not place his finger in exactly the same way on the fingerprint sensor 3 in connection with different authentication attempts. However, the user will expect the authentication attempts to succeed in at least all of the cases shown in FIGS. 1a-c to be motivated to continue to use fingerprint authentication.

Figure 2:
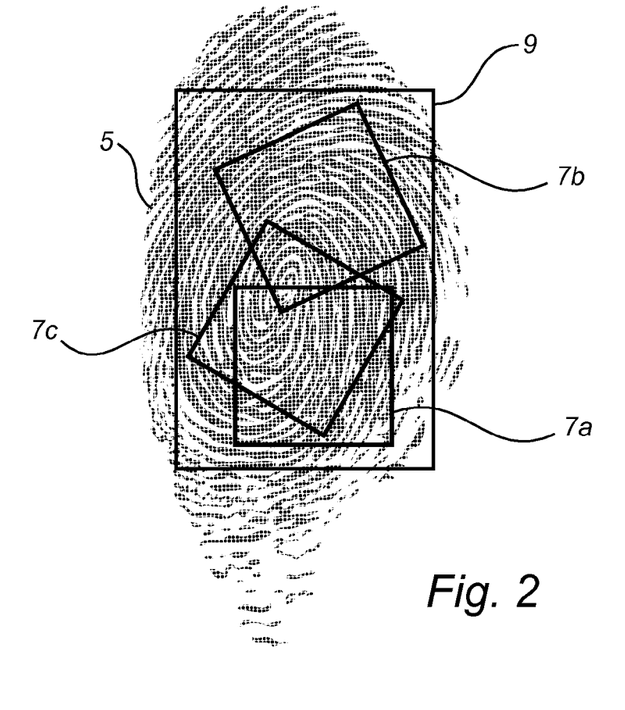
FIG. 2 schematically illustrates the partial fingerprint images acquired in FIGS. 1a-c in relation to the user's fingerprint.

In FIG. 2, the different portions of the user's fingerprint imaged in the different partial fingerprint images acquired in connection with the authentication attempts in FIGS. 1a-c are indicated on an illustration of the total fingerprint of the finger 5. In FIG. 2, the first fingerprint portion 7a corresponds to the authentication attempt in FIG. 1a, while the second 7b and third 7c fingerprint portions correspond to FIGS. 1b and 1c, respectively.

Considering the illustration in FIG. 2, it is easy to understand that, for all of the authentication attempts in FIGS. 1a-c to be successful, the stored fingerprint template used for authentication using the partial fingerprint images should correspond to a considerably larger portion of the user's fingerprint than each of the fingerprint portions 7a-c imaged by the partial fingerprint images. An exemplary minimum coverage of the stored fingerprint template is schematically indicated by the rectangle 9 in FIG. 2.

Having now briefly explained the need for a fingerprint template corresponding to a relatively large portion of the user's fingerprint, various embodiments of the present invention providing for such a fingerprint template will be described in the following.

Figure 3:
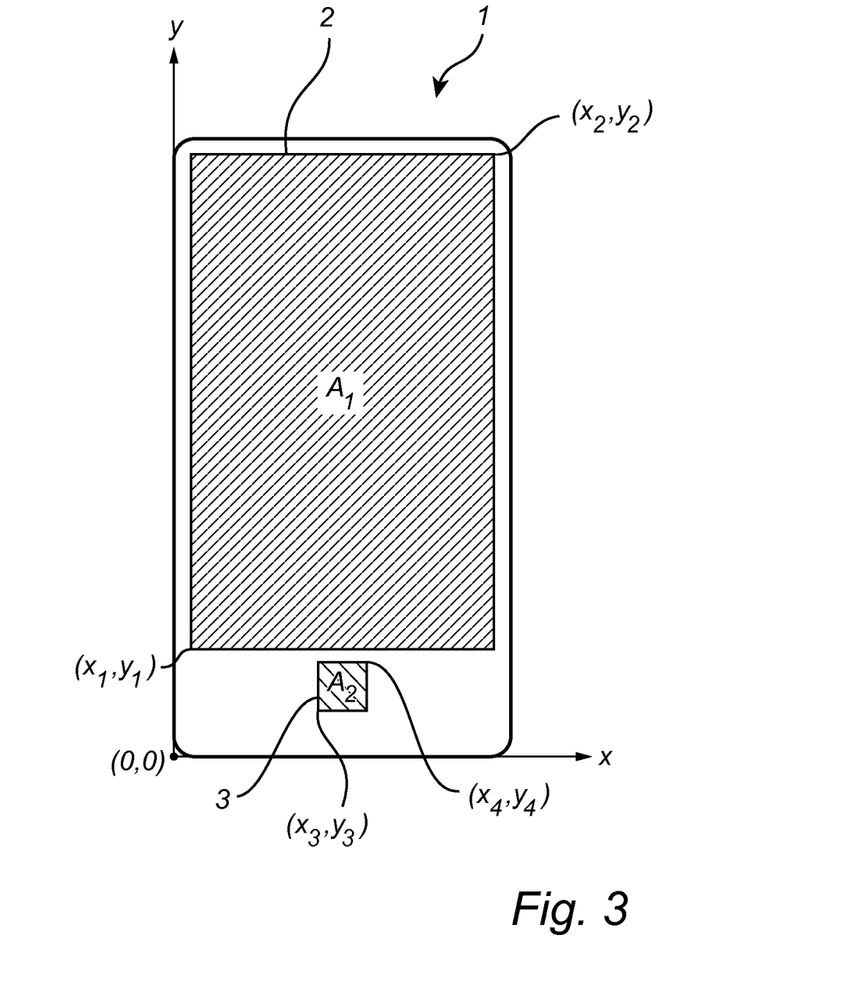
FIG. 3 schematically illustrates the positional relationship between touch sensor and fingerprint sensor in an electronic device according to embodiments of the present invention.

FIG. 3 schematically illustrates the positional relationship between touch sensor and fingerprint sensor in an electronic device according to embodiments of the present invention.

Referring to FIG. 3, the electronic device 1 comprises a touch display 2 including a touch sensor having an active area corresponding to a first surface portion $A_1$ of the electronic device 1, and a fingerprint sensor 3 having an active area corresponding to a second surface portion $A_2$ of the electronic device 1. The active area of the touch sensor 2 is the area in which the presence of a finger over the surface of the touch sensor can be detected, and the active area of the fingerprint sensor 3 is the area of the fingerprint sensor 3 that can be used for imaging a portion of the fingerprint.

In the illustrative example of FIG. 3, the first surface portion $A_1$ is defined by two co-ordinates—lower left corner $(x_1, y_1)$ and upper right corner $(x_2, y_2)$, and the second surface portion $A_2$ is defined by two co-ordinates—lower left corner $(x_3, y_3)$ and upper right corner $(x_4, y_4)$.

Through the known positional relationship between the first $A_1$ and second $A_2$ surface portions, a position in the first surface portion $A_1$ can be related to a position in the second surface portion $A_2$, and vice versa.

Figure 4:
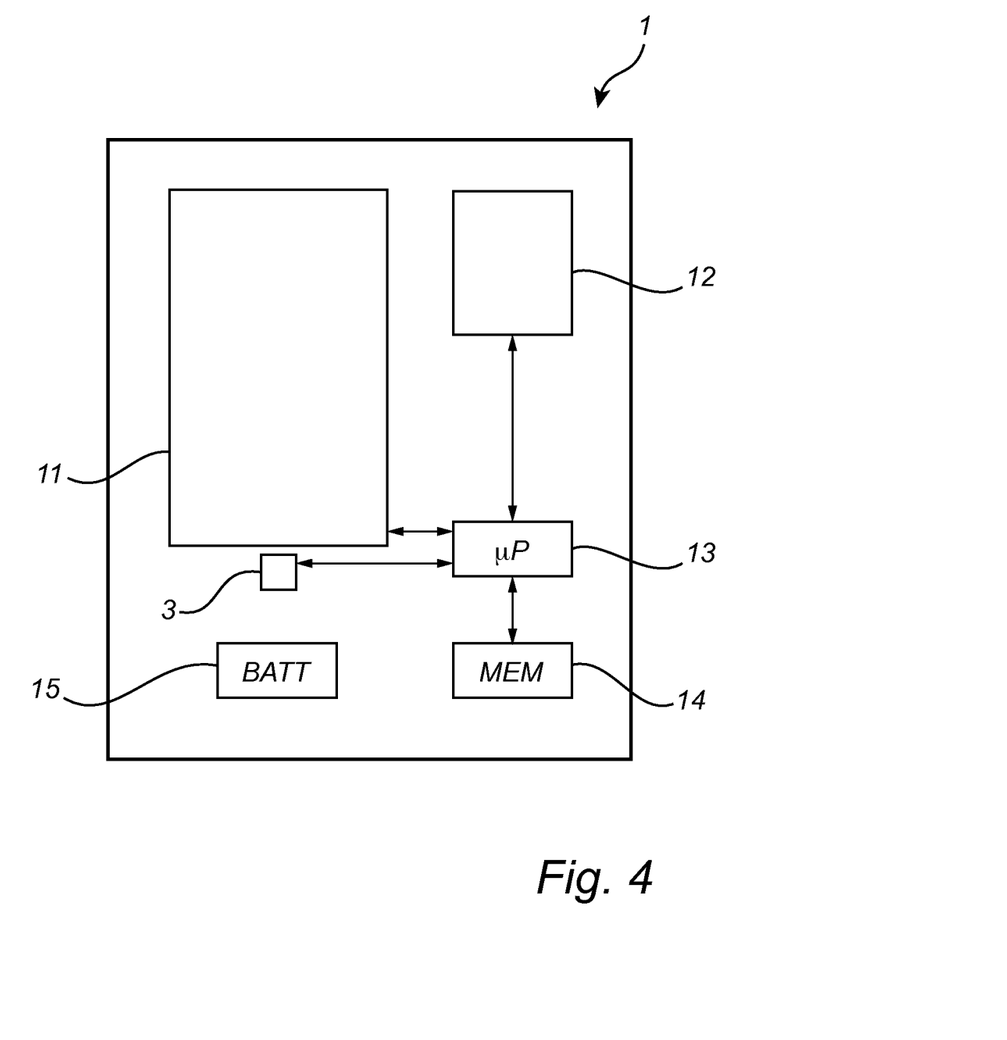
FIG. 4 is a block diagram of the electronic device in FIG. 3.

Referring to the block diagram in FIG. 4, the electronic device 1 in FIG. 3 comprises, in addition to the fingerprint sensor 3, a touch sensor 11 a display 12, processing circuitry here in the form of microprocessor 13, a memory 14 and a battery 15 for providing electrical energy to the various components of the electronic device 1. Although not shown in FIG. 4, the electronic device may comprise further components depending on application. For instance, the electronic device 1 may comprise circuitry for wireless communication, circuitry for voice communication, a keyboard etc.

Furthermore, although the processing circuitry is schematically indicated in FIG. 3 as a single microprocessor, it should be noted that this is a simplified illustration, and that the processing circuitry may comprise several processors. For instance, the processing circuitry may comprise a fingerprint processor dedicated for acquisition and processing of fingerprint images, template generation and/or authentication. Moreover, the processing circuitry may comprise a touch sensor processor dedicated for controlling the touch sensor etc.

Figure 5:
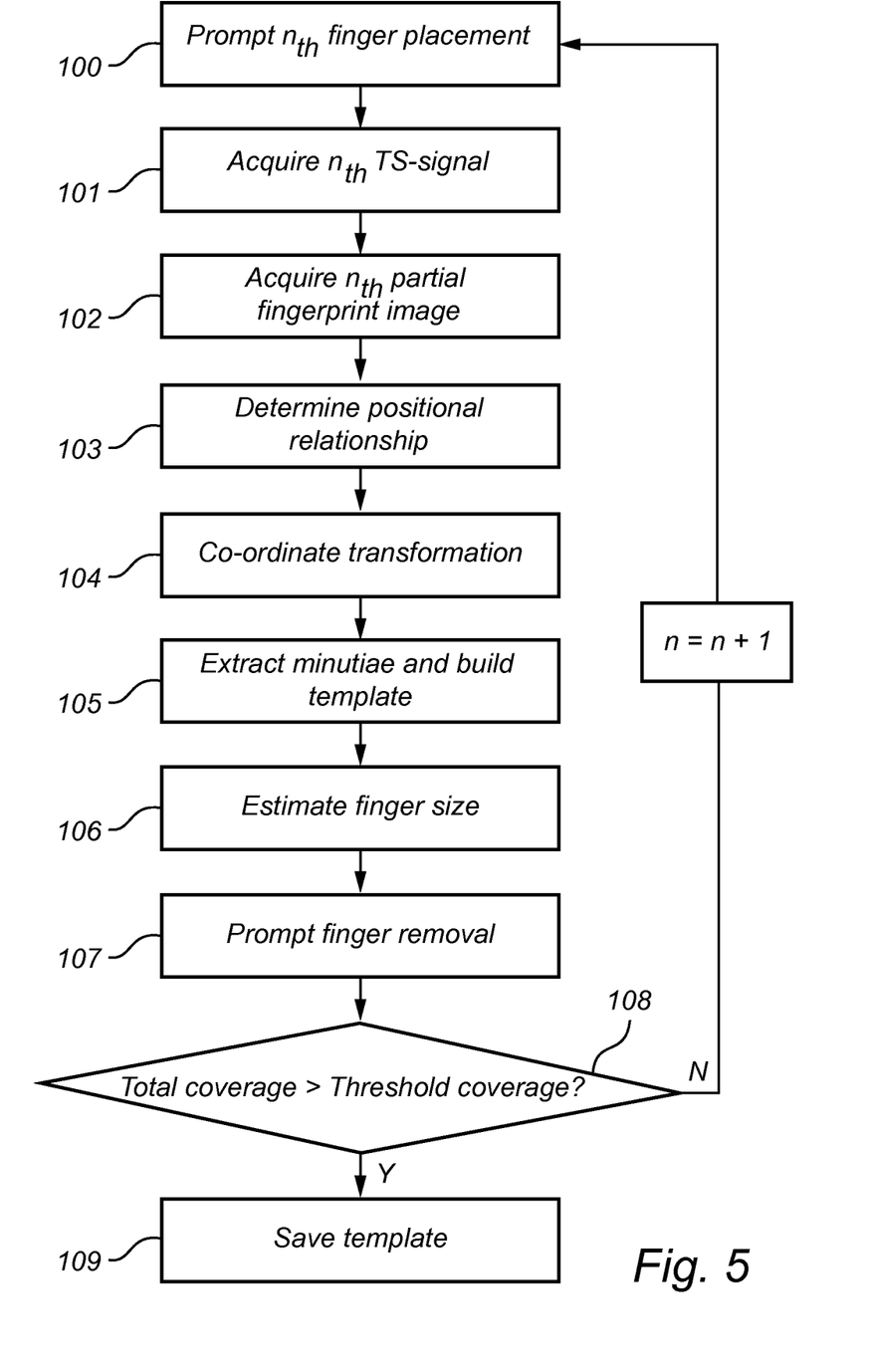
FIG. 5 is a flow-chart schematically illustrating an enrollment method according to an embodiment of the present invention.

An exemplary embodiment of the enrollment method according to the present invention will now be described with reference to the flow-chart in FIG. 5 together with the illustrations in FIG. 3, FIG. 4, FIGS. 6a-b, FIG. 7 and FIG. 8.

Figure 6A:
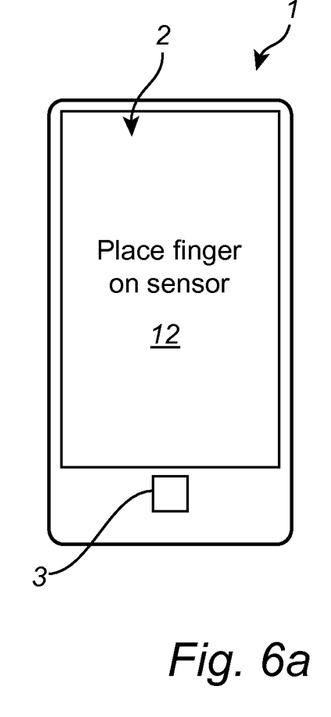
FIGS. 6a-b schematically illustrate a part of the enrollment sequence in FIG. 5.
Figure 6B:
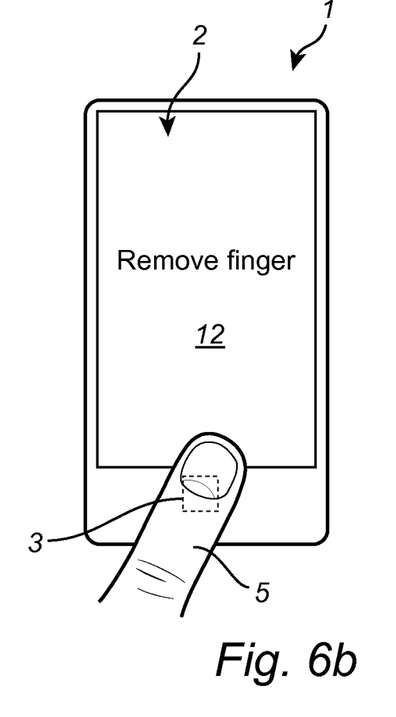

In a first step 100 of the enrollment method, the user is prompted to place, for the $n^{th}$ time, the finger to be enrolled on the fingerprint sensor 3. This step may be carried out by controlling, using the processing circuitry 13, a user interface, such as the display 12 in FIG. 4 and FIGS. 6a-b to display instructions to the user. An example instruction to the user is shown in FIG. 6a. When the finger 5 has been placed on the fingerprint sensor 3, as is schematically indicated in FIG. 6b, a touch sensor signal (the $n^{th}$ touch sensor signal) indicating a sub-area of the touch sensor 11 being touched by the finger 5 is acquired by the processor 13 in step 101. For the same finger placement and substantially concurrently, a partial fingerprint image (the $n^{th}$ partial fingerprint image) of the $n^{th}$ portion of the fingerprint of the finger 5 is acquired by the processor 13 from the fingerprint sensor 3 in step 102. It may not be necessary to acquire the touch sensor signal and the partial fingerprint image exactly simultaneously. In order to benefit from the correlation between the touch sensor signal and the partial fingerprint image, the time between the acquisitions of the respective signals (touch sensor signal and partial fingerprint image) should not be so long that the finger 5 has been moved between the acquisitions.

In the subsequent step 103, a positional relationship between the above-mentioned $n^{th}$ portion of the fingerprint and the finger 5 is determined based on the sub-area of the touch sensor 11 touched by the finger 5 and the known positional relationship between the surface portions of the electronic device 1 corresponding to the active areas of the touch sensor 11 and the fingerprint sensor 3 as was described further above.

Figure 7:
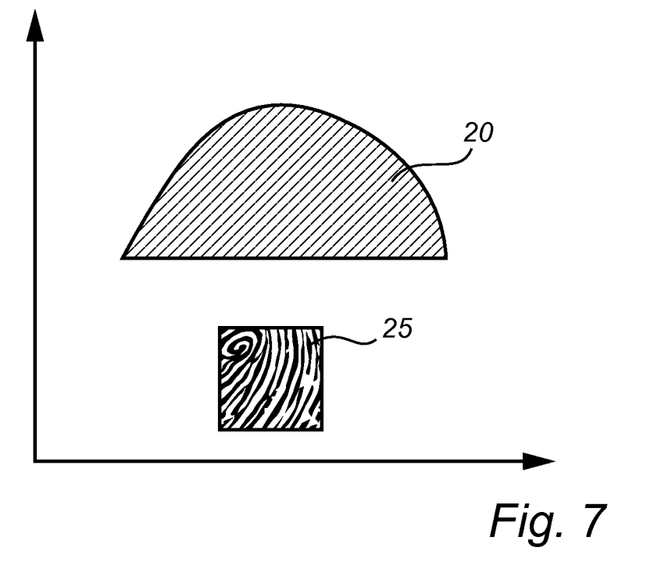
FIG. 7 schematically shows the sub-area of the touch sensor covered by the finger in FIG. 6b and the concurrently acquired partial fingerprint image in the co-ordinate system of the electronic device as shown in FIG. 3.

This positional relationship is schematically indicated in FIG. 7, where the $n^{th}$ sub-area 20 of the touch sensor 11 being touched by the finger 5 and the $n^{th}$ partial fingerprint 25 imaged in the $n^{th}$ partial fingerprint image are shown in the co-ordinate system of the electronic device 1 as described above with reference to FIG. 3.

Based on the positional relationship determined in step 103, the $n^{th}$ partial fingerprint image may be subjected to a co-ordinate transformation, in step 104, to map the partial fingerprint image (the $n^{th}$ portion of the fingerprint) to a co-ordinate system of the finger 5. This is schematically shown in the top half of FIG. 8, where an outline of the finger 5, indicated by a dashed line, defines a co-ordinate system $(x', y')$, and partial fingerprint images/fingerprint portions 25 are transformed to locations in this co-ordinate system.

Following (or before) the co-ordinate transformation in step 104, template data in the form of characteristic fingerprint information, such as minutiae, may be extracted, in step 105, from the $n^{th}$ partial fingerprint image to form a fingerprint template.

Figure 8:
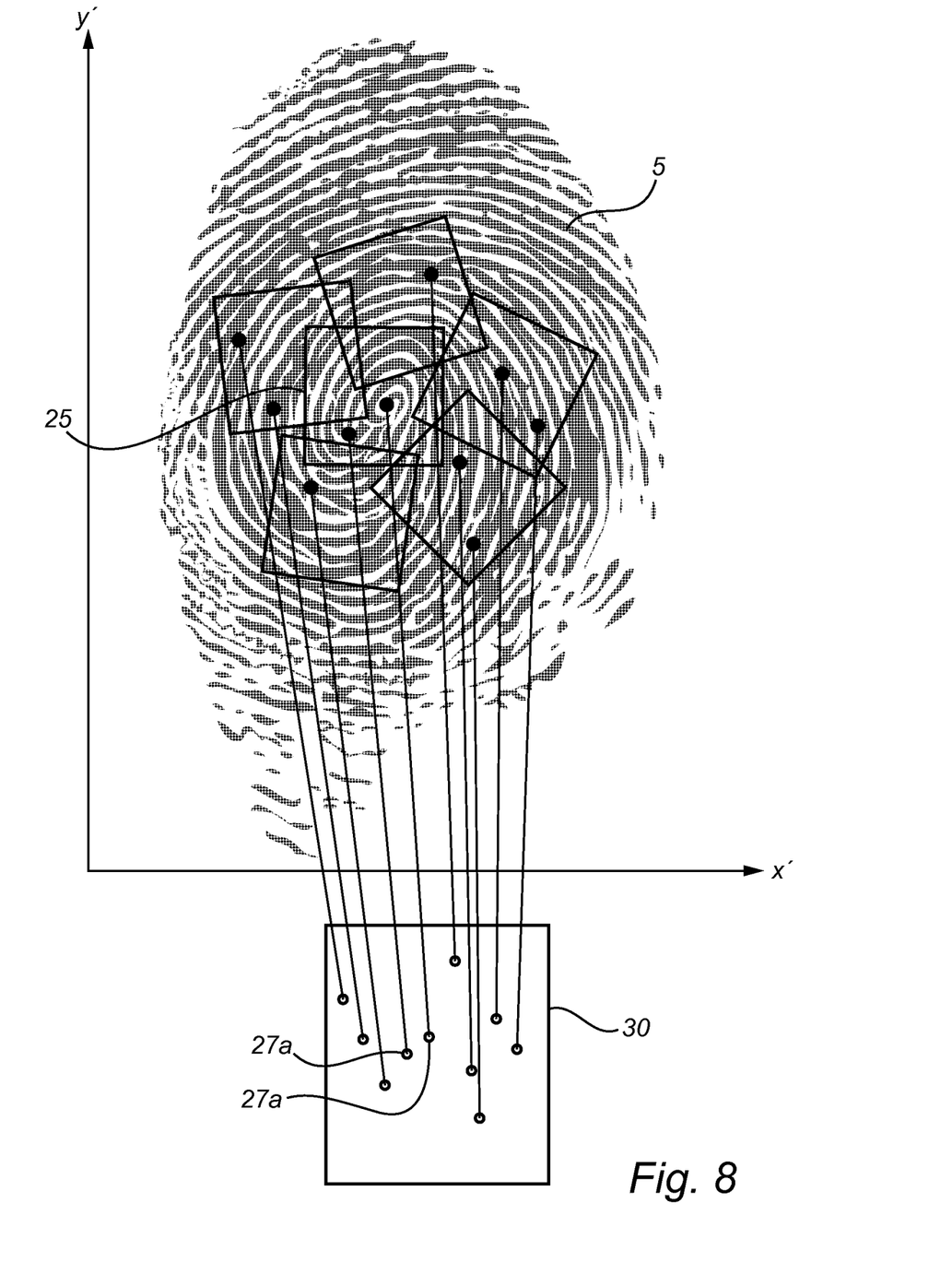
FIG. 8 is a schematic illustration of a sequence of partial fingerprint images in the co-ordinate system of the finger, and also illustrates the formation of a fingerprint template from the partial fingerprint images.

This procedure, which is per se well known to the skilled person, is schematically indicated for the $n^{th}$ partial fingerprint image 25 in FIG. 8, where minutiae 27a-b are shown to be extracted to a fingerprint template 30 with minutiae information and positions in relation to the finger 5.

In the next step 106, the size of the user's finger 5 is estimated based on the acquired $n^{th}$ touch sensor signal. In the flow chart of FIG. 5, this step 106 is shown as being part of a loop continuing until a sufficient coverage has been achieved by the acquired partial fingerprint images. It should be noted that this need not be the case, but that it may be sufficient to estimate the size of the user's finger 5 once, such as based on the first touch sensor signal acquired from the touch sensor.

Thereafter, in step 107, the user is prompted, as is schematically indicated in FIG. 6b, to remove his finger.

In the following step 108, it is determined if the total coverage of the fingerprint by the portions of the fingerprint that have been imaged so far exceeds a threshold coverage that is determined based on the estimated finger size.

If it is determined in step 108 that the total coverage does not exceed the threshold coverage, such as would be the case when only the first partial fingerprint image has been acquired, then the method increments a counter and returns to the first step 100 of the method to acquire a new touch sensor signal and a new partial fingerprint image etc.

If it is determined in step 108 that the total coverage exceeds the threshold coverage, the formed template 30 is saved to memory 14 in step 109 and the enrollment procedure is finalized.

So far, embodiments of the electronic device 1 according to embodiments of the present invention have been described in which the fingerprint sensor 3 is arranged closely adjacent to a touch display 2 comprising a touch sensor 11.

Figure 9A:
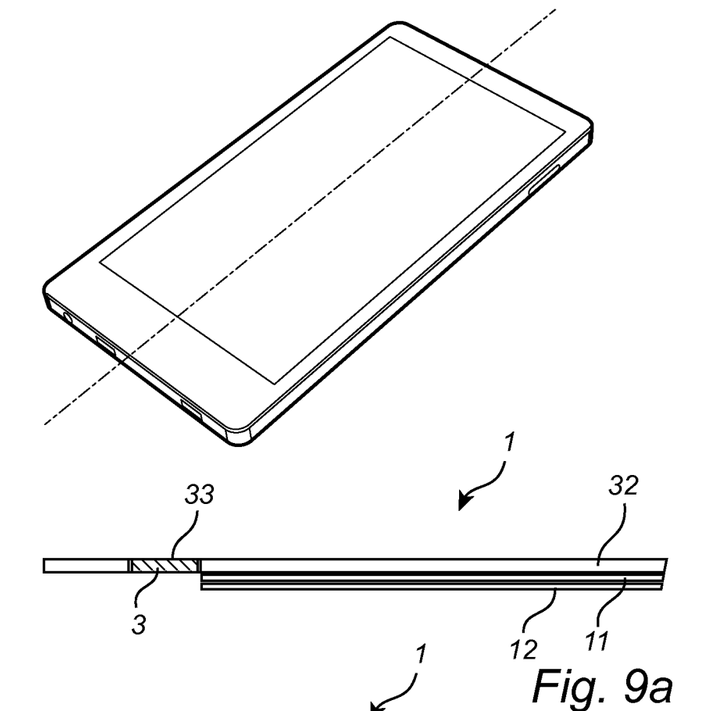
FIGS. 9a-b schematically illustrate two embodiments of the electronic device according to the present invention.

An example of this configuration is shown in a simplified and schematic cross-section view in FIG. 9a, where the electronic device is shown to comprise a cover glass, 32, a transparent touch sensor 11, a display 12, and a fingerprint sensor component 3. As can be seen in FIG. 9a, the touch sensor is sandwiched between the display 12, which may for example be an LCD, and the cover glass 32, and the fingerprint sensor component is arranged in an opening of the cover glass 32, with the top surface 33 of the fingerprint sensor 3 being arranged substantially flush with the top surface of the cover glass 32.

Figure 9B:
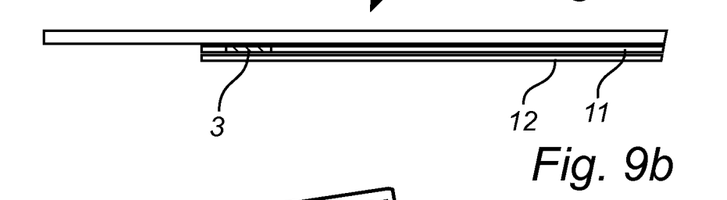

In another embodiment, which is shown in a similar cross-section view in FIG. 9b, the fingerprint sensor 3 is instead provided as a portion of the touch sensor 11. The fingerprint sensor portion of the touch sensor 11 may, for example, have a considerably higher resolution than the rest of the touch sensor 11.

Figure 10:
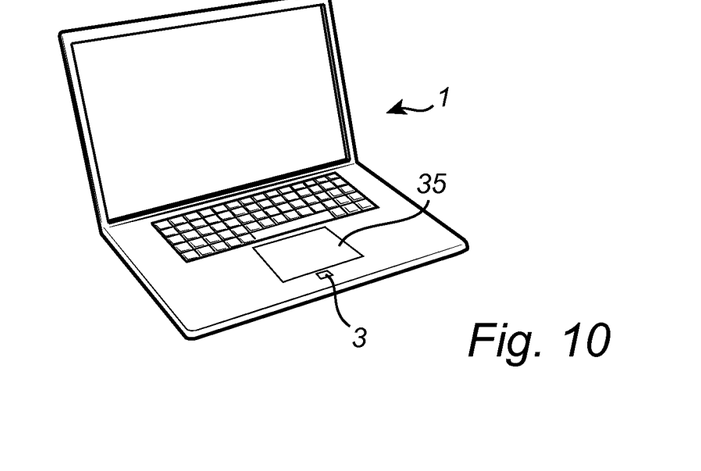
FIG. 10 schematically illustrates a further embodiment of the electronic device according to the present invention.

As has been mentioned previously, the electronic device need not be a mobile phone or tablet, and the touch sensor need not be comprised in a touch display. For instance, as is schematically illustrated in FIG. 10, the electronic device 1 may instead be provided in the form of a laptop computer, and the touch sensor may be provided in the form of a track pad 35 of the computer.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A method of enrolling a fingerprint of a user's finger, by means of an electronic device comprising:
   a touch sensor for touch-based control of said electronic device, said touch sensor having an active area corresponding to a first surface portion of said electronic device; and
   a fingerprint sensor having an active area corresponding to a second surface portion of said electronic device, said method comprising the steps of:
   a) acquiring, from said touch sensor, for each finger placement in a sequence of finger placements on said fingerprint sensor, a touch sensor signal indicative of a sub-area of said touch sensor being touched by said finger;
   b) acquiring, from said fingerprint sensor, for each finger placement in said sequence of finger placements on said fingerprint sensor, a partial fingerprint image of a portion of said fingerprint;
   c) determining, for each finger placement in said sequence of finger placements on said fingerprint sensor, a positional relationship between said portion of the fingerprint and said finger based on said sub-area and a positional relationship between said first and second surface portions of the electronic device;
   d) forming a fingerprint template based on said acquired partial fingerprint images and said determined positional relationships; and
   e) saving said fingerprint template together with an identifier for said fingerprint to thereby enroll said fingerprint.

2. The method according to claim 1, further comprising the step of:
   f) determining a total coverage of said fingerprint by said portions of said fingerprint imaged in said sequence of finger placements.

3. The method according to claim 2, wherein steps a) to c) are repeated until said determined total coverage exceeds a threshold coverage.

4. The method according to claim 3, further comprising the step of:
   g) determining said threshold coverage based on at least one acquired touch sensor signal.

5. The method according to claim 4, wherein step g) comprises the steps of:
   g1) determining at least one dimension of said finger based on said at least one acquired touch sensor signal; and
   g2) determining said threshold coverage based on said at least one dimension.

6. The method according to claim 1, wherein step a) and step b) are performed substantially concurrently.

7. The method according to claim 1, further comprising the step of:
   h) prompting, prior to step a), for each finger placement in said sequence of finger placements, said user to place said finger on the fingerprint sensor.

8. The method according to claim 1, wherein step c) comprises determining a finger contour based on said sub-area.

9. The method according to claim 1, further comprising the step of:
   i) extracting, prior to step d), for each finger placement in said sequence of finger placements on said fingerprint sensor, template data from said partial fingerprint image.

10. An electronic device comprising:
    a touch sensor for touch-based control of said electronic device, said touch sensor having an active area corresponding to a first surface portion of said electronic device;
    a fingerprint sensor having an active area corresponding to a second surface portion of said electronic device;
    a user interface;
    a memory; and
    processing circuitry connected to said touch sensor, said fingerprint sensor, said user interface, and said memory for:
    acquiring, from said touch sensor, for each finger placement in a sequence of finger placements on said fingerprint sensor, a touch sensor signal indicative of a sub-area of said touch sensor being touched by said finger;
    acquiring, from said fingerprint sensor, for each finger placement in said sequence of finger placements on said fingerprint sensor, a partial fingerprint image of a portion of said fingerprint;
    determining, for each finger placement in said sequence of finger placements on said fingerprint sensor, a positional relationship between said portion of the fingerprint and said finger based on said sub-area and a positional relationship between said first and second surface portions of the electronic device;
    forming a fingerprint template based on said acquired partial fingerprint images and said determined positional relationships; and
    saving, in said memory, said fingerprint template together with an identifier for said fingerprint to thereby enroll said fingerprint.

11. The electronic device according to claim 10, wherein said touch sensor and said user interface are constituted by a touch display.

12. The electronic device according to claim 10, wherein said second surface portion is adjacent to said first surface portion.

* * * * *

UNITED STATES PATENT AND TRADEMARK OFFICE
CERTIFICATE OF CORRECTION

Page 1 of 1

PATENT NO.         : 9,514,352 B2
APPLICATION NO.    : 14/833809
DATED              : December 6, 2016
INVENTOR(S)        : Eric Setterberg et al.

It is certified that error appears in the above-identified patent and that said Letters Patent is hereby corrected as shown below:

On the Title Page

(73) Assignee should read: FINGERPRINT CARDS AB, GÖTEBORG, SWEDEN (SE)

Signed and Sealed this
Seventh Day of February, 2017

Michelle K. Lee
*Director of the United States Patent and Trademark Office*